(No Model.) 3 Sheets—Sheet 3.
R. FRASER.
FEED WATER HEATING AND CIRCULATING APPARATUS.
No. 407,435. Patented July 23, 1889.
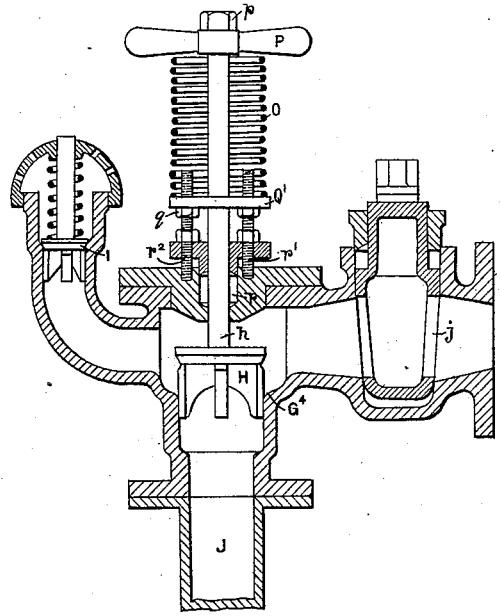
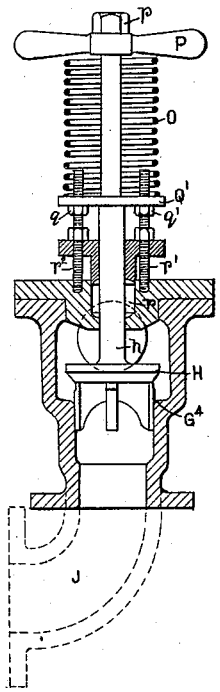
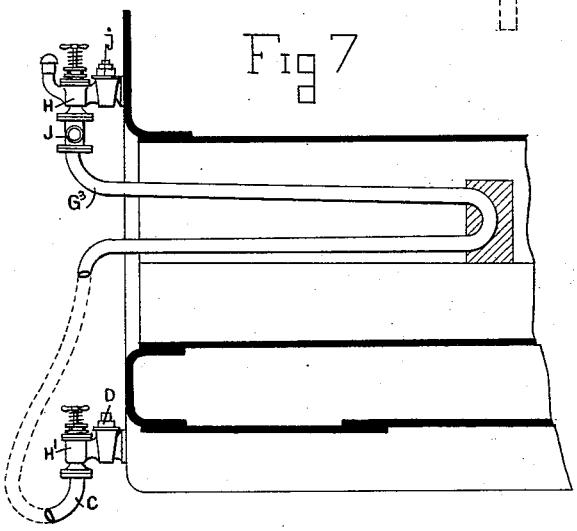
Witnesses
Inventor
Robert Fraser
By Phil. T. Dodge
Atty

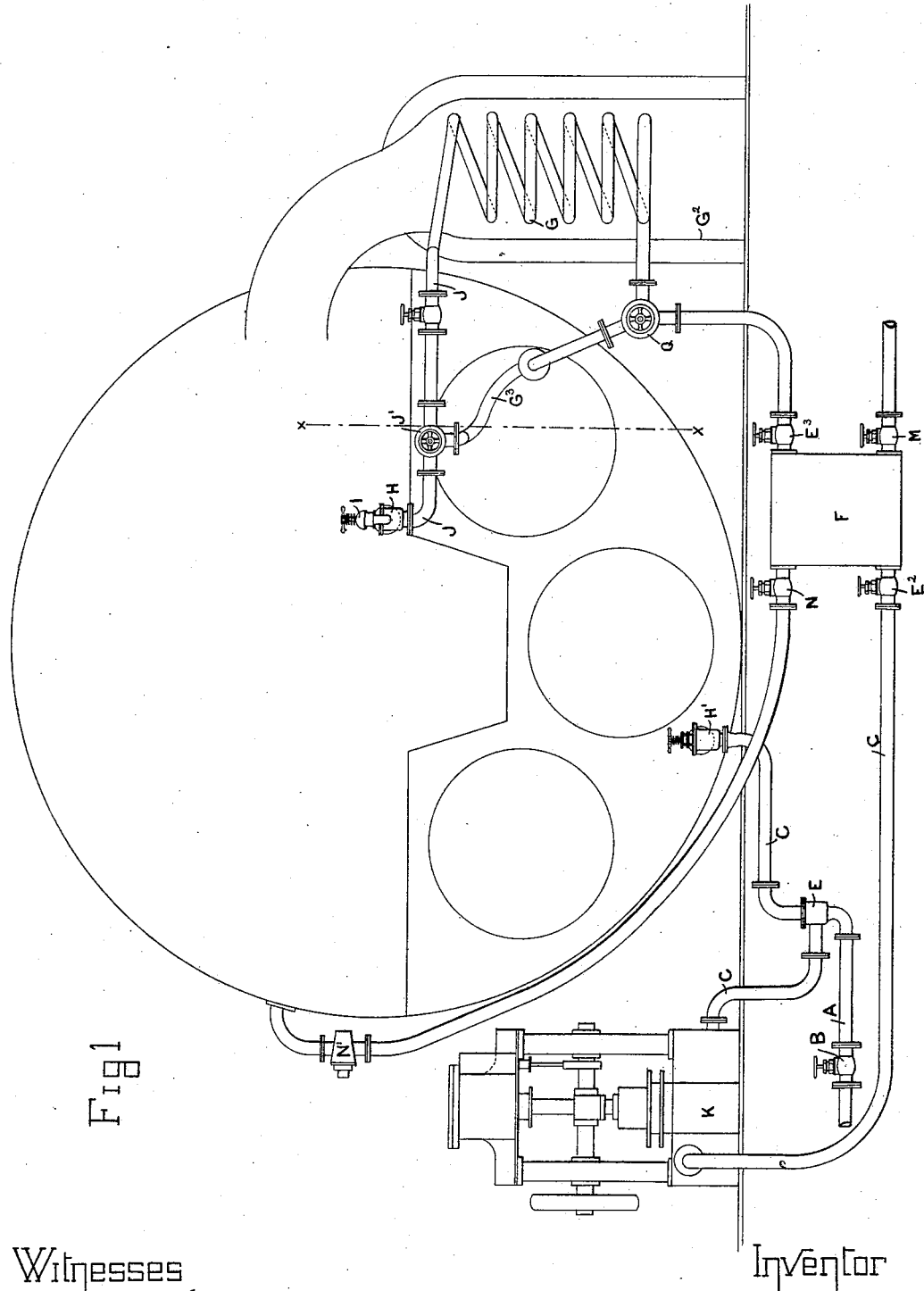

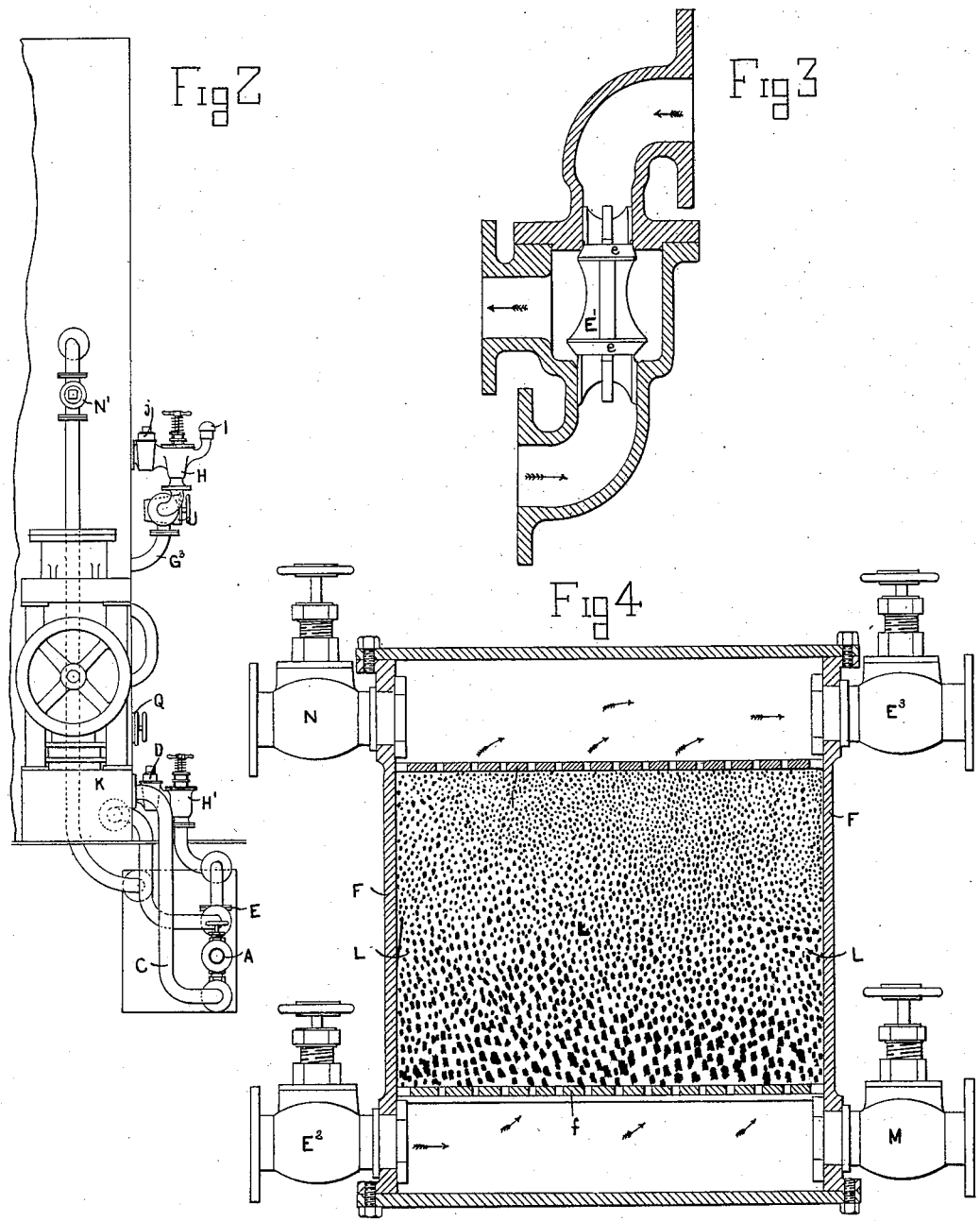

UNITED STATES PATENT OFFICE.

ROBERT FRASER, OF LIVERPOOL, COUNTY OF LANCASTER, ENGLAND.

FEED-WATER HEATING AND CIRCULATING APPARATUS.

SPECIFICATION forming part of Letters Patent No. 407,435, dated July 23, 1889.

Application filed October 19, 1888. Serial No. 288,530. (No model.) Patented in England March 2, 1887, No. 3,210; in Germany April 26, 1887, No. 41,176; in France August 31, 1887, No. 185,748; in Belgium August 31, 1887, No. 78,730; in Italy December 31, 1887, XXI, 22,536, XLIV, 329; in New South Wales March 12, 1888, No. 543; in Victoria March 12, 1888, No. 5,692; in Austria-Hungary March 22, 1888, No. 41,510, and No. 6,140; in Canada October 20, 1888, No. 48,718, and in India November 5, 1888, No. 105.

*To all whom it may concern:*

Be it known that I, ROBERT FRASER, steamship owner, a subject of the Queen of Great Britain, residing at Liverpool, in the county of Lancaster, in the Kingdom of Great Britain, have invented certain new and useful Improvements in Feed-Heating and Water-Circulating Apparatus, (patented in England, No. 3,210, dated March 2, 1887; in France, No. 185,748, dated August 31, 1887; in Germany, No. 41,176, dated April 26, 1887; in Belgium, No. 78,730, dated August 31, 1887; in Italy, XXI, 22,536, XLIV, 329, dated December 31, 1887; in Austria-Hungary, No. 41,510 and No. 6,140, dated March 22, 1888; in New South Wales, No. 543, dated March 12, 1888; in India, No. 105, dated November 5, 1888; in Victoria, No. 5,692, dated March 12, 1888, and in Canada, No. 48,718, dated October 20, 1888,) of which the following is a specification.

This invention has for its object an arrangement for increasing the circulation of the water in the boiler, heating the feedwater, and eliminating the solid impurities therein. It is best described by aid of the accompanying drawings, in which—

Figure 1 is a diagrammatic front elevation of the invention, partly in section; Fig. 2, a side elevation of same. Fig. 3 is a vertical section of automatic feed and circulating valve. Fig. 4 is a vertical section of filter. Figs. 5 and 6 are longitudinal and transverse sections, respectively, of combined self-acting stop-valve and safety-valve; Fig. 7, a section through furnace, on line $x\ x$, Fig. 1.

A is the feed-water pipe; B, stop-cock on same; C, pipe leading to the boiler near its lowest point; D, stop-cock thereon; E, automatic feed and circulating valve; F, filter; G, a coiled pipe or water-conduit arranged in any convenient manner in a subsidiary furnace $G^2$, Fig. 1, and $G^3$ a further heating-pipe in one furnace—there can be two of these in each furnace, if desirable, one on each side; H H', self-acting stop-valves; I, safety-valve; J, pipe leading to the boiler at a point at or near the water-line, but preferably below the said line; $j$, stop-cock thereon; K, a pump, which is placed on pipe C between the automatic valve E and the filter F. It could, however, if desired, be placed on the pipe C between the valve E and the boiler, or even beyond the filter and between the latter and the furnace. The feed is pumped as required into the boiler in the usual manner. No feed-pump is shown, as I do not claim it as a part of my invention, (and indeed pump K can perform the work of the feed-pump,) and in the same way the stop-cocks B and D and the pump K are only indicated in outline, as they also are stop-cocks and pump of any ordinary description, and, except as parts of a combination, form no part of my invention.

An automatic feed and circulating valve E is shown in section in Fig. 3. In this E' is a double valve arranged with its ground surfaces $e\ e$ at a distance from each other less than the distance between the valve-seats to an extent equal to the ordinary lift of a valve, so that one or other valve must inevitably be open. If, then, the feed-water pipe A is feeding to the furnace-pipe G or $G^3$, the valve E' is raised and closes the pipe C. The moment, however, the feed stops, the valve E' drops and the water from the bottom of the boiler coming through C circulates freely through the valve E, pump K, filter F, and pipe G or $G^3$ back into the boiler, the pump K being so arranged as to permit the water to pass through it when not working; or, when working, the pump itself could cause the water to circulate from the bottom of the boiler through the pipe C, &c., to the top of the boiler. Filter F is set forth in Fig. 4.

$f$ is a perforated false bottom. Plate $f'$ is a similarly-perforated top plate; L, filtering material arranged in layers between these plates, the coarsest layers at the bottom. The water from the cock $E^2$ passes through the filtering material L and the cock $E^3$ and through the three-way cock Q to the furnace-pipe G or $G^3$. When the filter gets clogged, the cocks at $E^2$ and $E^3$ are closed, the waste-cock M opened, and water or steam under pressure from the boiler turned on at N or N', thus quickly cleaning the filter by reverse action, when the cocks are again reversed. Valves H, I, and *j* are shown combined in Figs. 5 and 6. In these, J is the pipe leading to the boiler; *j*, stop-cock thereon, of any ordinary type, and H self-acting stop-valve on seat G⁴, leading from pipe J; *h*, spindle passing through stuffing-box *r*, as shown, and controlled by spring O. This is under compression between stop P, adjustable by means of nut *p*, and plate Q, adjusted in position by nuts *q* on the stuffing-box studs *r'* *r*².

I is a spring safety-valve. It can be arranged so as to be controlled by weights and to lock up, if preferred. In fact any ordinary safety-valve will do.

The mode of action is as follows: When the feed-pump is working, or when the pump K acts as feed-pump, the feed-water passes through pipe A, pump K, lower part of pipe C, pipe G or G³, and pipe J into the boiler. It also passes through the filter F on the apparatus shown. The filter F can, however, be on the pipe C between the boiler and the valve E, in which case the feed-water would not be filtered unless this were done by a special filter at any other point of its course. When the feed stops, the pump K draws the water from the bottom of the boiler through the valve E (or through both valve and filter if the latter be placed between the lower part of the boiler and the pump) and forces it through the filter F into furnace-pipe G or G³ and back into the boiler at a point preferably below the water-level, as before stated; or this action may be reversed. As the suction of the pump would have a tendency to close the automatic valve H', I prefer to put an air-vessel on the pipe between this valve and the pump, so as to equalize the pressure and lessen the maximum suction on the valve. The tension of the spring of the valve is also adjusted by hand to that point at which the suction of the pump will just fail to close it, so that a slight additional lessening of the pressure caused by a leak or fracture will close it. Where no filter is used the pump is not required and the valve can be made to close by a very small reduction-pressure on its lower side. If the furnace-pipe—say G³, which is the one usually used—were to burst from any cause, the valves H and H' would immediately close automatically by reason of the reduction of pressure below them. Then the pipe G could be cut out of the circuit by means of valves J' and Q, and the entire circulation would pass through the other furnace pipe or pipes G³. Pipe G is provided more especially for such occasions, as when the pipes G³ are in order the connection with the pipe G can be cut off by the valves and the subsidiary furnace G² need not be fired. If an undue pressure occurs in the furnace-pipes, safety-valve I relieves it. Valve H' is not shown in detail, as it is similar to H, except that it has no safety-valve I attached to it.

I claim as my invention—

1. The combination of a water-heating apparatus G or G³ with self-acting valves H H' at each end of the circulating-pipes, safety-valve I, a pipe C, connecting one end of the apparatus with a low point of the boiler, and a second pipe J, connecting the other end with the boiler higher up, substantially as described.

2. The combination of a pipe or pipes G G³, passing through a heating-space and having automatic cut-off valves H H', one at each end of the circulating-pipes, and a safety relief-valve I, with automatically-adjustable feed and circulating valve E, feed-pipe A, and pipe C, connected with the bottom of the boiler, substantially as described.

3. In a feed-water circulating and cleaning apparatus, the boiler, the three-way self-acting valve E, the pipe delivering the feed-water thereto, and the pipe connecting said valve with the boiler at a point below the water-line, in combination with the pump K and filter F and their connecting-pipes, and the pipe connecting said filter with the boiler, whereby on the cessation of the feed the water from the boiler automatically passes therefrom through the valve to the pump, and is forced thereby through the filter to the boiler.

4. The combination of a heating-pipe G G³, passing through a furnace, with a pipe C, leading to the bottom of a boiler, and pipe J, leading to the boiler at or near the water-line, pipes C and J being fitted with automatic valves H H', respectively, and a safety-valve I being also on the circuit, whereby overpressure is avoided, and in case of fracture escape of water and steam from the boiler is prevented.

5. In a feed-water-circulating apparatus, the inwardly-opening self-acting stop-valve H, in combination with the outwardly-opening relief-valve I, communicating therewith and formed as one piece with the valve H.

6. In a feed-water-circulating apparatus, the self-acting stop-valve H, kept open by the force of the water entering the boiler, in combination with the relief-valve I, communicating with said valve and closed under ordinary pressure, but adapted to open under undue pressure in the valve H, whereby said valve H is rendered available both as an automatic stop-valve and a relief-valve.

7. In a circulating apparatus for a boiler, a pipe G, and a separate furnace for heating said circulating-pipe outside the boiler, in combination with stop-valves between it and the boiler at both ends of the circulating-pipe, whereby, if the pipe fails, it can be cut off from the boiler and repaired at leisure without any stoppage of the boiler.

8. The combination of a circulating-pipe G³, passing through the furnace of a boiler, with a self-acting stop-valve at each end capable of self-closing when the pressure on the circulating-pipe is reduced to a given amount below the pressure in the boiler, and a safety-valve on said pipe, whereby the bursting of said pipe from undue pressure is prevented, and if a fracture occurs the said pipe is instantly cut off from the boiler.

9. In a boiler having a circulating and feed-heating pipe passing through the furnace, a subsidiary circulating-pipe and subsidiary furnace besides the ordinary furnace, whereby, when an accident happens to the ordinary circulating and feed-heating pipe in the boiler-furnace, the said pipe may be put out of operation and the circulation and feed-heating may be conducted through the subsidiary pipe.

In testimony whereof I have signed my name to this specification in the presence of two subscribing witnesses.

ROBERT FRASER.

Witnesses:
JOHN GORDON NAVIN,
WILLIAM JOHN MOWATT.